United States Patent

[11] 3,575,668

[72] Inventor Peter W. Smith
 Little Silver, N.J.
[21] Appl. No. 713,923
[22] Filed Mar. 18, 1968
[45] Patented Apr. 20, 1971
[73] Assignee Bell Telephone Laboratories, Incorporated
 Murray Hill, Berkeley Heights, N.J.

[54] LASER FREQUENCY STANDARD EMPLOYING AN OPTICAL LIMITER
 4 Claims, 1 Drawing Fig.

[52] U.S. Cl. .................................................. 331/94.5,
 356/256
[51] Int. Cl. ...................................................... H01s 3/10
[50] Field of Search ............................................ 331/94.5

[56] References Cited
UNITED STATES PATENTS
3,434,779 3/1969 Damen et al. ................. 331/94.5

OTHER REFERENCES
Herriott et al. " Folded Optical Delay Lines" , Applied Optics, Vol. 4, No. 8, Aug. 1965, pp 883— 889

*Primary Examiner*—Ronald L. Wibert
*Assistant Examiner*—R. J. Webster
*Attorneys*—R. J. Guenther and Arthur J. Torsiglieri ABSTRACT: The disclosed laser has, within its resonator, an active medium and an optical limiter adapted to limit at very low levels in order to provide a very narrow effective linewidth at the peak of the atomic gain-versus-frequency curve. The optical resonator is made sufficiently long, for example, by including therein a subsidiary folded resonator, to have a resonance within the narrow effective linewidth. The limiter provides the laser with a self-stabilizing characteristic that minimizes the effects of random fluctuations in the cavity loss or in the gain of the active medium.

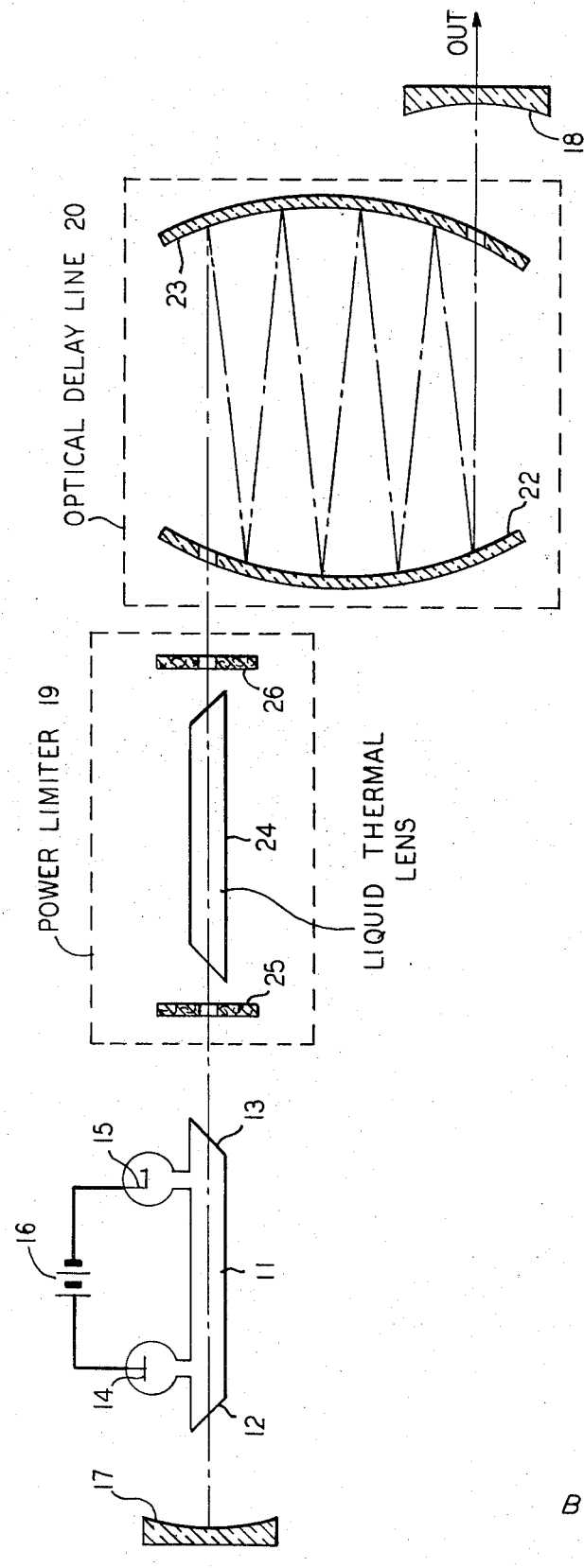
INVENTOR
*P. W. SMITH*
BY
*Wilford L. Wisner*
ATTORNEY

3,575,668

LASER FREQUENCY STANDARD EMPLOYING AN OPTICAL LIMITER

BACKGROUND OF THE INVENTION

This invention relates to lasers having relatively narrow effective linewidths. A laser with a sufficiently narrow linewidth at the peak of the atomic gain-versus-frequency curve is very useful as a frequency standard.

Although it has long been hoped that lasers might be useful as frequency standards, various effects exist which broaden the linewidth of a laser, that is, the band of frequencies at which stimulated radiation can be emitted from a laser under appropriate tuning conditions. Moreover, various disturbances inherent in the operation of lasers tend to move the oscillation frequency or frequencies around within this linewidth. Typically, mechanical fluctuations in the length of the laser cavity cause the frequency of laser oscillation to vary even though oscillation is only occurring at a single resonator mode.

Various techniques have been proposed to counteract the frequency-varying effect of fluctuations in the laser cavity length. For example, it has been proposed that a frequency standard could be built consisting of a chain of laser amplifiers separated by frequency-independent constant losses. The output radiation will have a much narrower bandwidth than the atomic gain curve if the losses are large enough so that the gain of the amplifiers is everywhere essentially unsaturated. The output consists of spontaneous emission amplified by passage through the system. If the gain is unsaturated, the gain-versus-frequency characteristic is peaked at the atomic line center and the radiation is progressively narrowed in frequency as it passes through the system. In practice, extremely long length of gain medium and very close control of losses is required for this arrangement.

As a consequence of the foregoing difficulties, most atomic resonance frequency standards do not employ lasers or multiple-pass optical stimulated emission arrangements.

Very few frequency standards have been proposed to operate at optical frequencies. However, some have been proposed to operate by repetitively doubling lower (millimeter wave) frequencies.

It would be desirable to have frequency standards operating directly at optical frequencies, inasmuch as this would reduce problems of frequency doubling to obtain optical frequencies from frequency standards operating in lower frequency ranges. In this context, optical frequencies are infrared, visible and ultraviolet. The low-frequency limit of the infrared corresponds to a wavelength of about 100 microns.

SUMMARY OF THE INVENTION

According to my invention, I have recognized that optical stimulated emission structures can be adapted for use in optical frequency standards by disposing within an optical resonator an active medium and an optical power limiter providing a power-dependent but frequency-independent loss approaching the maximum gain of the active medium with respect to frequency. Accordingly, the limiter is adapted to provide a frequency-independent loss that approaches the peak gain of the medium at a power level below that at which the gain begins to saturate. If the gain is unsaturated, the gain-versus-frequency characteristic is peaked at the atomic line center. If these conditions are satisfied, the linewidth of the oscillator will be $c/2L$, where $c$ is the velocity of light and $L$ is the total optical length of the resonator.

In the presence of a mechanical disturbance of the resonator, the maximum frequency excursion from the center of the atomic gain curve will be limited to $c/4L$ in either direction. Since the effective linewidth of the laser oscillation is $c/2L$, it can be made arbitrarily small by making $L$ correspondingly large.

The limiter advantageously provides the laser with a self-stabilizing characteristic that minimizes the effects of random fluctuations in the gain of the active medium. If the gain suddenly changes, the loss in the limiter also changes in the same sense so that it limits at essentially the same level as before.

According to one feature of my invention, the optical resonator is made sufficiently long to have a resonance within a narrow effective linewidth by, for example, including therein an optical delay line such as a multiple-pass reflective structure, sometimes called a folded optical delay line.

According to another feature of my invention, the optical power limiter may comprise a negative thermal lens in tandem with at least one absorbing body or other lossy element that has an aperture disposed to pass the central portion of the diverging beam. As disclosed in the copending application of T.C. Damen et al., Ser. No. 525,216, filed Feb. 4, 1966 and assigned to the assignee hereof, now U.S. Pat. No. 3,434,779, the negative thermal lens may be a liquid thermal lens in which a radiation-absorbing liquid produces a defocusing refractive index gradient transverse to the path of the radiation therein. The amount of absorption and the amount of defocusing is directly related to the power of the radiation passing through the liquid. Nevertheless, unlike the arrangement shown in the above-cited application of Damen et al., the limiter employed in a laser according to my invention is adapted to provide a loss approaching the unsaturated peak gain of the active medium.

BRIEF DESCRIPTION OF THE DRAWING

Further features and advantages of my invention will become apparent from the following detailed description, taken together with the drawing, in which the sole FIG. is a partially pictorial and partially schematic illustration of a preferred embodiment of the invention.

DESCRIPTION OF ILLUSTRATIVE EMBODIMENT

In the drawing, there is shown a laser that is suitable for use as an optical frequency standard. The laser illustratively comprises a gaseous active medium contained in a glass envelope 11 that has Brewster-angle end windows 12 and 13 and laterally disposed regions in which the anode 14 and the cathode 15 are contained. Electrical excitation power is applied to the gaseous active medium through electrodes 14 and 15 by connecting the anode 14 to the positive terminal of voltage source 16 and the cathode 15 to the negative terminal of source 16. The electrical excitation power is said to pump the active medium.

The envelope 11 and the active medium which it contains are disposed in an optical resonator formed by the focusing reflectors 17 and 18. Reflector 1 is coated to be opaque; but reflector 18 is coated to be partially transmissive, so that output radiation is obtained at the desired frequency. This output radiation can be used to provide a frequency against which other frequencies can be compared, or for any other use of a highly stable, monochromatic optical frequency.

Also included between end window 13 and output reflector 18, are a power limiter 19 and an optical delay line 20.

The power limiter 19 illustratively includes a liquid thermal lens 24, which is a negative lens in which the strength of the defocusing effect is thermally responsive, i.e., directly related to the power of radiation absorbed in the liquid. The thermally responsive liquid in lens 24 is illustratively nitrobenzene. The lens 24 includes a glass-walled container with Brewster-angle end windows, which transmit the radiation not absorbed by the liquid in the container. The power limiter 19 also includes the apertured members 25 and 26, illustratively black absorbing cardboard or absorbing glass, disposed on opposite sides of the lens 24 with their apertures centered in the path of the radiation. The area of each aperture is selected to be sufficiently less than the normal cross-sectional area of the beam that would exist in the absence of power limiter 19, so that the gain of the laser is essentially unsaturated at the radiation level at which the laser oscillates. It should be noted that the members 25 and 26 can be eliminated if the tube 11 has a sufficiently small bore and one of reflectors 22 or 23 has a sufficiently small aperture to be the equivalent apertured means for passing only a limited central portion of the defocused radiation.

The optical delay line 20 illustratively includes a reflective, multiple-pass structure that provides a desired optical path length in the laser without imposing any additional resonator modes upon the laser. The path length is sufficient to make the overall mode frequency spacing of the laser equal to or less than the narrow effective linewidth, as affected by limiter 19. The mode frequency spacing is the frequency difference between the center frequencies of adjacent resonant modes of the complete laser. Specifically, the delay line 20 comprises the nearly concentric reflectors 22 and 23 having apertures positioned so that the beam enters oblique to a radius of reflector 22 and continues to be reflected in directions oblique to local radii of either reflectors 22 and 23 until the beam exits through the aperture of reflector 23. Preferably, the reflectors 22 and 23 are made slightly astigmatic, for example, by increasing or decreasing the radius of curvature in one coordinate but not the other. The number of multiple passes can be made very great by this method without permitting any portion of the beam to have a reentrant path within delay line 20.

A reentrant path is a path in which a portion of the beam can retrace its path, or resonate, within delay line 20 alone. The lack of any reentrant path within delay line 20 prevents it from imposing its own resonant modes upon the resonant modes of the complete resonator of the laser.

Typically, reflectors 22 and 23 would have broadband reflectivity, although this characteristic is not required if they have their peak reflectivity in a frequency range encompassing the narrow effective linewidth of the complete laser.

In operation, it is not necessary to perform a vernier, or fine, adjustment of the overall resonator length to bring a resonator resonance close to the atomic line center frequency of the active medium, as the atomic line center frequency is also essentially the center frequency of the narrow effective linewidth of the complete laser. The laser will always oscillate only on that cavity mode which is closest to the atomic line center. This mode should cause the limiter to limit at a level for which all other cavity modes will be suppressed. As the length of the resonator is changed, another cavity mode may find itself closest to line center, and power will build up in this mode, suppressing the first one. Thus, the maximum frequency excursion of our frequency standard from line center is one-half of the cavity mode spacing, or $c/4L$ ($c$ being the velocity of light and $L$ the length of the cavity). This can be made small by making $L$ sufficiently long.

Suppose now that a transient occurs in the excitation power supplied by source 16 to the gaseous medium in tube 11. The coherent light intensity in tube 11 will increase. Power limiter 19 absorbs some of the additional light intensity in the liquid of lens 24. The thermal gradient changes because the liquid increases in temperature more on the axis of the beam than near the edges of the beam. Correspondingly, the index of refraction changes (decreases) more on the axis than near the edges of the beam. In nitrobenzene and most other liquids in which absorption changes optical properties, the resulting index of refraction gradient produces increased defocusing of the beam. The apertures in members 25 and 26 pass a smaller portion of the beam, in terms of cross-sectional area. The result is that the intensity of the portion of the beam which is passed remains essentially constant.

The foregoing sequence of events can be summarized in the following terms of the optical art. The absorbing liquid acts like a negative lens when a laser beam passes through it; and the power of this lens changes in direct relation to the changing intensity of the laser beam passing through it. Thus, for increasing laser intensities, the aperture will intercept a larger portion of the incident beam power and will produce increased loss in such an amount that the transmitted portion of the beam remains almost constant. Similarly, if the light intensity in tube 11 decreases, the power of the negative lens 24 decreases, and the loss presented to the beam decreases by substantially the amount expected in limiter.

The limiting level of limiter 19 can be adjusted by varying the absorption of the liquid, the size of the apertures, or the single-pass path length of the light within the liquid.

It should be understood that other absorption phenomena could be employed to implement a limiter suitable for use in my invention. For example, it is known a parametric oscillator has a threshold pumping power. In one modification of the embodiment of the drawing, limiter 19 includes, instead of the components shown, a nonlinear crystal suitable for a parametric oscillator. The coherent light in the laser is employed as the pumping power to generate a parametric oscillation in the crystal. The parametrically generated radiation then propagates out of the crystal without entering any other components of the laser. The unabsorbed, threshold pumping light is all that remains to propagate into delay line 20. The unabsorbed light is limited at the threshold level. Raman or Brillouin scattering may be employed to eliminate the unwanted coherent light power in a similar fashion, provided the scattering occurs laterally and not appreciably in the forward direction.

Moreover, other techniques exist for providing the desired optical path length in the resonator. For example, a long laser resonator might have sufficient path length to permit elimination of delay line 20, although the resulting apparatus would be larger than usually desirable. Other forms of optical delay line might include prisms of relatively high index of refraction. Such prisms would be adapted for multiple internal reflection of the beam in a nonreentrant path. Optical path length is directly proportional to index of refraction.

My invention is also applicable to ring lasers.

I claim:

1. A laser comprising first and second reflectors forming a resonator, an active laser medium disposed within said resonator, means for pumping said active medium, and an optical power limiter disposed within said resonator for providing a loss approaching the peak gain of said active medium with respect to frequency for a power level below that at which the gain of said medium would begin to saturate.

2. A laser according to claim 1 in which the resonator includes an optical delay line of length making the overall longitudinal mode frequency spacing of the laser equal to or less than the effective linewidth of said laser, as affected by the limiter.

3. A laser comprising an optical resonator of path length $L$, an active laser medium disposed within said resonator, means for pumping said active medium, and means for limiting the power level within said resonator with a loss substantially equal to the unsaturated peak gain of said active medium with respect to frequency, whereby the laser has an effective linewidth suitable for a source of standard frequency, said path length $L$ being selected to make the overall longitudinal mode frequency spacing of the laser equal to or less than said effective linewidth of said laser.

4. A laser according to claim 3 in which the resonator includes a nonreentrant folded optical delay line providing a major portion of the path length $L$